United States Patent
Pickering et al.

(10) Patent No.: US 8,600,756 B2
(45) Date of Patent: Dec. 3, 2013

(54) HANDLING A TELEPHONE CALL BY VOICE ANALYTICS IN A COMPUTER-TELEPHONY INTEGRATION SYSTEM

(75) Inventors: Richard Pickering, Basingstoke (GB); Joseph Moussalli, Basingstoke (GB); Ashley Unitt, Basingstoke (GB)

(73) Assignee: New Voice Media Ltd., Basingstoke (GB)

( * ) Notice: Subject to any disclaimer, the term of this patent is extended or adjusted under 35 U.S.C. 154(b) by 355 days.

(21) Appl. No.: 12/999,899

(22) PCT Filed: Jun. 19, 2009

(86) PCT No.: PCT/GB2009/001564
§ 371 (c)(1),
(2), (4) Date: Feb. 8, 2011

(87) PCT Pub. No.: WO2009/153581
PCT Pub. Date: Dec. 23, 2009

(65) Prior Publication Data
US 2011/0125498 A1   May 26, 2011

(30) Foreign Application Priority Data

Jun. 20, 2008  (GB) .................................. 0811411.8

(51) Int. Cl.
*G10L 15/22* (2006.01)
*H04M 3/42* (2006.01)
(52) U.S. Cl.
USPC .................. 704/270.1; 704/275; 379/265.06; 379/266.07
(58) Field of Classification Search
USPC ......... 704/246, 270.1, 275; 379/88.01, 88.02, 379/88.2, 88.21, 207.13, 207.15, 265.06, 379/265.07, 266.07
See application file for complete search history.

(56) References Cited

U.S. PATENT DOCUMENTS

| | | | |
|---|---|---|---|
| 6,831,966 B1 * | 12/2004 | Tegan et al. ................ | 379/88.16 |
| 6,868,154 B1 | 3/2005 | Stuart | |
| 7,076,032 B1 * | 7/2006 | Pirasteh et al. ............ | 379/88.18 |
| 7,103,553 B2 * | 9/2006 | Applebaum et al. .......... | 704/275 |
| 7,191,133 B1 | 3/2007 | Pettay | |
| 7,536,304 B2 * | 5/2009 | Di Mambro et al. ......... | 704/273 |
| 7,933,387 B1 * | 4/2011 | Baker, IV ................ | 379/266.07 |
| 8,180,643 B1 * | 5/2012 | Pettay et al. .................. | 704/270 |
| 8,379,834 B2 * | 2/2013 | Weinstein et al. ....... | 379/266.07 |
| 2003/0179877 A1 * | 9/2003 | Dezonno et al. ......... | 379/266.07 |
| 2004/0006464 A1 | 1/2004 | Geppert | |
| 2004/0062363 A1 | 4/2004 | Shambaugh et al. | |

(Continued)

FOREIGN PATENT DOCUMENTS

| | | |
|---|---|---|
| EP | 1009148 A2 | 12/1999 |
| EP | 1381210 A1 | 7/2003 |

(Continued)

*Primary Examiner* — Martin Lerner
(74) *Attorney, Agent, or Firm* — Galvin Patent Law LLC; Brian R. Galvin

(57) ABSTRACT

The invention provides a computer-implemented method of handling a telephone call, comprising monitoring a conversation between an agent and a customer on a telephone line as part of the telephone call to extract the audio signal therefrom. Real-time voice analytics are performed on the extracted audio signal while the telephone call is in progress. The results from the voice analytics are then passed to a computer-telephony integration system responsible for the call for use by the computer-telephony integration system for determining future handling of the call.

17 Claims, 6 Drawing Sheets

(56) References Cited

U.S. PATENT DOCUMENTS

| | | |
|---|---|---|
| 2005/0283475 A1 | 12/2005 | Beranek et al. |
| 2006/0195321 A1* | 8/2006 | Deligne et al. .............. 704/257 |
| 2007/0011008 A1* | 1/2007 | Scarano et al. ............. 704/254 |
| 2008/0133219 A1* | 6/2008 | Doulton ........................... 704/8 |
| 2008/0159488 A1* | 7/2008 | Raja ........................ 379/88.02 |
| 2009/0030692 A1* | 1/2009 | Deligne et al. .............. 704/257 |
| 2009/0248418 A1* | 10/2009 | Jaiswal et al. .............. 704/275 |
| 2010/0158239 A1* | 6/2010 | Anisimov et al. ........ 379/266.07 |

FOREIGN PATENT DOCUMENTS

| | | |
|---|---|---|
| EP | 1096767 A3 | 5/2004 |
| GB | 2393605 A | 3/2004 |
| GB | 2405553 A | 2/2005 |
| GB | 2440574 A | 6/2008 |
| JP | 2003209625 A | 12/1997 |
| KR | 200572334 A | 7/2005 |

* cited by examiner

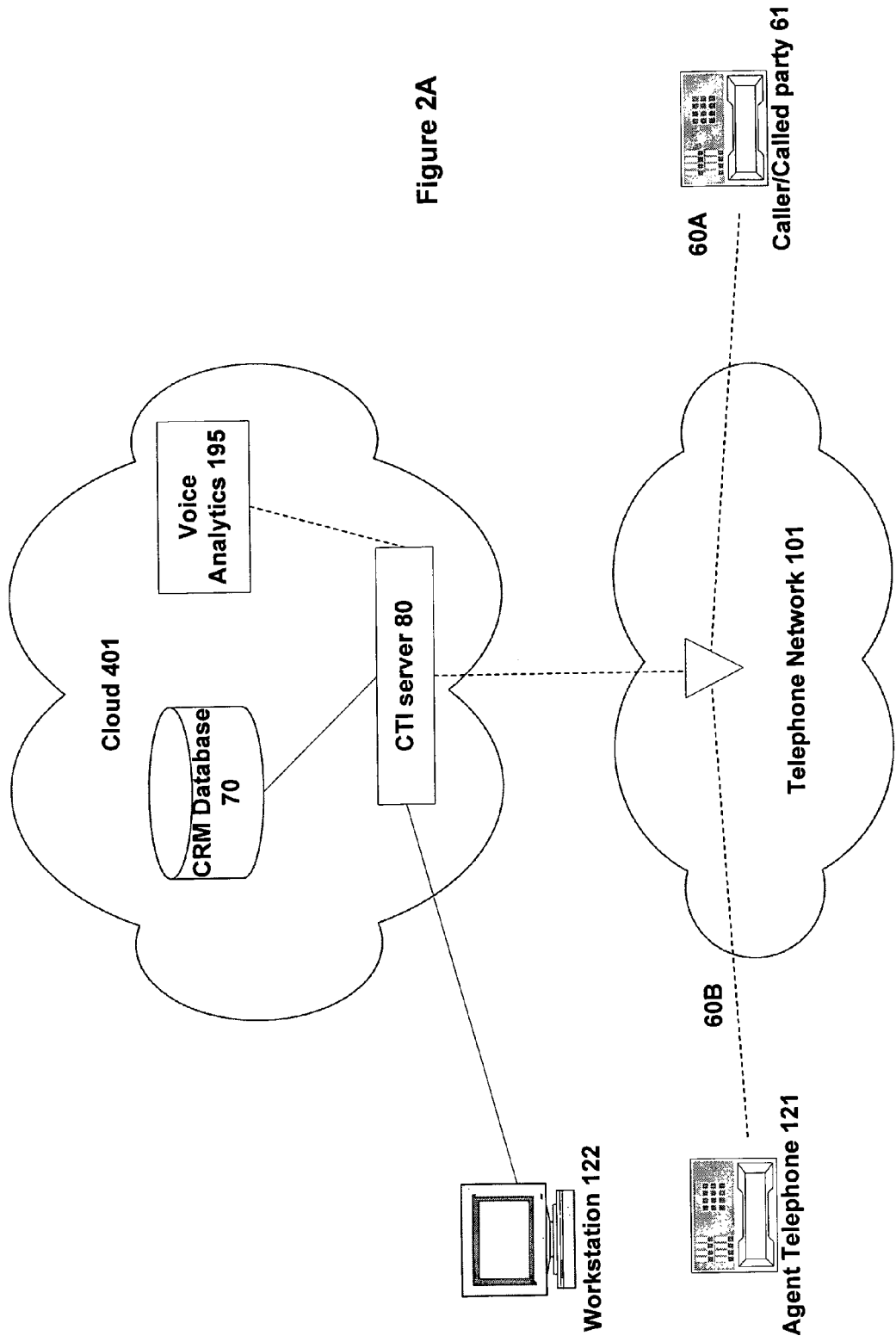

HANDLING A TELEPHONE CALL BY VOICE ANALYTICS IN A COMPUTER-TELEPHONY INTEGRATION SYSTEM

FIELD OF THE INVENTION

The invention relates to a method and apparatus for handling a telephone call utilising voice analytics in combination with a computer-telephony integration system.

BACKGROUND OF THE INVENTION

Voice analytics represent the computerised processing of a (digitised) speech audio signal to extract information. Known techniques for voice analytics include:

speech recognition—converting the received speech into corresponding text. This is available in various formats, such as discrete word/continuous speech, finite vocabulary, and so on. Another form of speech recognition is phonetic analysis (searching for specific phoneme patterns in audio recordings), for example as provided by Aurix (www.aurix.com).

speaker identification—recognising the identity of the speaker from a set of possible speakers.

speaker authentication—confirming whether a speaker is who they claim to be (this can be considered as analogous to speaker identification from a set of one possible speaker).

lie detection—trying to confirm whether or not the speaker is telling the truth. This is generally performed by looking at underlying biophysical signals, such as heart-rate, imprinted onto the speech audio signal.

Speech recognition has been used for many years in handling telephone calls. This is generally done to provide an input mechanism for a caller, especially if the information to be acquired from the caller is non-numeric or where the caller cannot produce DTMF tones (or equivalent). For example, a telephone information service for theatres may first prompt a caller to state which town they are enquiring about Speech recognition is then performed on this spoken input to identify the relevant town. The caller can then be provided with listings information for the theatre(s) in the identified town.

Another (generally more recent) application of voice analytics is to investigate previous telephone calls. For example, a call centre may record all telephone calls involving the call centre. Speech recognition can then be performed on the relevant audio signals, and the resulting text stored as a record of the call. The stored text can then be searched, for example to analyse all calls where a caller asked about a particular product or service.

It is also known (although less common) to use voice analytics to support the real-time processing of telephone calls. Examples of such systems are described in the following documents:

GB 2405553—this guides a conversation taking place between a client and an agent at a call centre by detecting the information content of the conversation using voice recognition, determining a goal of the client from the detected information content, and suggesting a conversation topic to the agent to guide the conversation.

U.S. Pat. No. 7,191,133 describes using automatic speech recognition in a call centre to determine agent compliance with a script. The results may be available either after the call has completed (via call recording) or in real-time. Actions based on the compliance determination include sending the voice interaction to a quality assurance monitor for review, sending a voice or text message to the agent, updating an incentive program, etc.

US 2005/0238475 describes monitoring speech at a call centre and detecting keywords in the speech. Information can then be retrieved based on the keywords and provided automatically to the agent handling the call.

GB 2393605 detects the emotion of the speaker, for example based on speaking rate, and uses this information to provide call centre agents with appropriate scripts. US 2004/0062363 provides similar functionality, based on the assessed stress level of the caller, as measured for example by voice analysis.

Nevertheless, existing systems generally do not exploit the full power and potential of voice analytics in a telephone environment.

SUMMARY OF THE INVENTION

The invention is defined in the appended claims.

One embodiment of the invention provides a computer-implemented method of handling a telephone call. The method comprises monitoring a conversation between an agent and a customer on a telephone line as part of said telephone call to extract the audio signal therefrom; performing real-time voice analytics on the extracted audio signal while the telephone call is in progress, and passing results from the voice analytics to a computer-telephony integration system responsible for the call. The computer-telephony system is located in a service provider equipment (SPE) environment. The method further comprises using said results by the computer-telephony integration system for determining future handling of the call. Placing the voice analytics and computer-telephony services in the network rather than at a customer premises offers increased flexibility and efficiently.

In one particular embodiment, the computer-telephony system is implemented on a cloud computing service. This provides increased scalability which is particular of benefit for call centre operations.

Another embodiment of the invention provides a computer-implemented method of handling a telephone call. The method comprises monitoring a conversation between an agent and a customer on a telephone line as part of said telephone call to extract the audio signal therefrom; performing real-time voice analytics to perform speech recognition on the extracted audio signal while the telephone call is in progress, and passing results from the voice analytics to a computer-telephony integration system responsible for the call; and using said results by the computer-telephony integration system for determining future handling of the call in respect of compliance testing in order to confirm that the agent has made one or more predetermined statements relating to a transaction during the telephone conversation. If the voice analytics system does not confirm that the agent has made said one or more predetermined statements, the computer-telephony integration system automatically prevents the agent from completing the transaction with the caller.

This therefore allows a company to demonstrate more clearly that its operations are fully in accordance with the compliance requirements. It also helps having to cancel transactions for which it later comes to light that no compliance statement was provided (and any liability arising from such situations).

In one embodiment, if the voice analytics system does not confirm that the agent has made the one or more predetermined statements, the application flow for the call is modified to help ensure that the one or more one predetermined statements are made while the telephone call is still in progress. The modification of the application flow may include transferring the caller to an interactive voice response system to make the one or more predetermined statements automatically. The transaction may be allowed to complete after modification of the application flow and the one or more predetermined statements have been made.

Another embodiment of the invention provides a computer-implemented method of handling a telephone call. The method comprises receiving an incoming telephone call at a computer-telephony system and obtaining a calling line identification associated with the call; monitoring a conversation between an agent and a customer on a telephone line as part of said telephone call to extract the audio signal therefrom; performing real-time voice analytics for speaker authentication on the extracted audio signal while the telephone call is in progress, and passing results from the voice analytics to a computer-telephony integration system responsible for the call; and using said results by the computer-telephony integration system for authenticating a party on the call by a combination of the voice analytics results and the calling line identification. This combination of speaker authentication and calling identification provides a robust, secure, yet simple and reliable security mechanism and may obviate the need for any additional mechanisms (such as PIN entry, which may be liable to loss or forgetting).

In one embodiment, the speaker authentication is performed against a stored template for the customer which is identified based on the calling line ID. The stored template may be obtained in a registration procedure, for example when first setting up an account.

Another embodiment of the invention provides a computer-implemented method of handling a telephone call, the method being performed in an SPE environment within a telephone network. The method comprises monitoring a conversation between an agent and a customer on a telephone line as part of said telephone call to extract the audio signal therefrom; performing real-time voice analytics on the extracted audio signal by a voice analytics system while the telephone call is in progress, and passing results from the voice analytics to a computer-telephony integration system responsible for the call, the computer-telephony integration system and the voice analytics system being located in the network in said SPE environment; and using said results by the computer-telephony integration system.

Another embodiment of the invention provides a computer-telephony integration system for handling a telephone call in an SPE environment within a telephone network. The system comprises a line connection for monitoring a conversation between an agent and a customer on a telephone line as part of said telephone call to extract the audio signal therefrom; a voice analytics system located in the SPE environment for performing real-time voice analytics on the extracted audio signal while the telephone call is in progress, and for passing results from the voice analytics to a computer-telephony integration server responsible for the call; and a computer-telephony integration server located in the SPE environment for receiving the results from the voice analytics system and using said results for determining future handling of the call.

Another embodiment of the invention provides a computer-telephony integration system for handling a telephone call. The system comprises a line connection for monitoring a conversation between an agent and a customer on a telephone line as part of said telephone call to extract the audio signal therefrom; a voice analytics system for performing real-time voice analytics to perform speech recognition on the extracted audio signal while the telephone call is in progress; and a computer-telephony integration system for using the results from the voice analytics system to determine future handling of the call in respect of compliance testing and to confirm that the agent has made one or more predetermined statements relating to a transaction during the telephone conversation, wherein if the voice analytics system does not confirm that the agent has made said one or more predetermined statements, the computer-telephony integration system is configured to prevent the agent from completing the transaction with the caller.

Another embodiment of the invention provides a computer-telephony integration system for handling a telephone call. The system comprises a line connection for monitoring a conversation between an agent and a customer on a telephone line as part of said telephone call to extract the audio signal therefrom and for obtaining a calling line identification associated with the call; a voice analytics system for performing real-time voice analytics for speaker authentication on the extracted audio signal while the telephone call is in progress; and a computer-telephony integration system for authenticating the customer on the call by a combination of the results from the voice analytics system and the calling line identification.

BRIEF DESCRIPTION OF THE DRAWINGS

Various embodiments of the invention will now be described in detail by way of example only with reference to the following drawings:

FIG. 2A is a schematic diagram of a call being bridged in an SPE environment using a cloud implementation and voice analytics in accordance with one embodiment of the invention.

DETAILED DESCRIPTION

Figure 1:
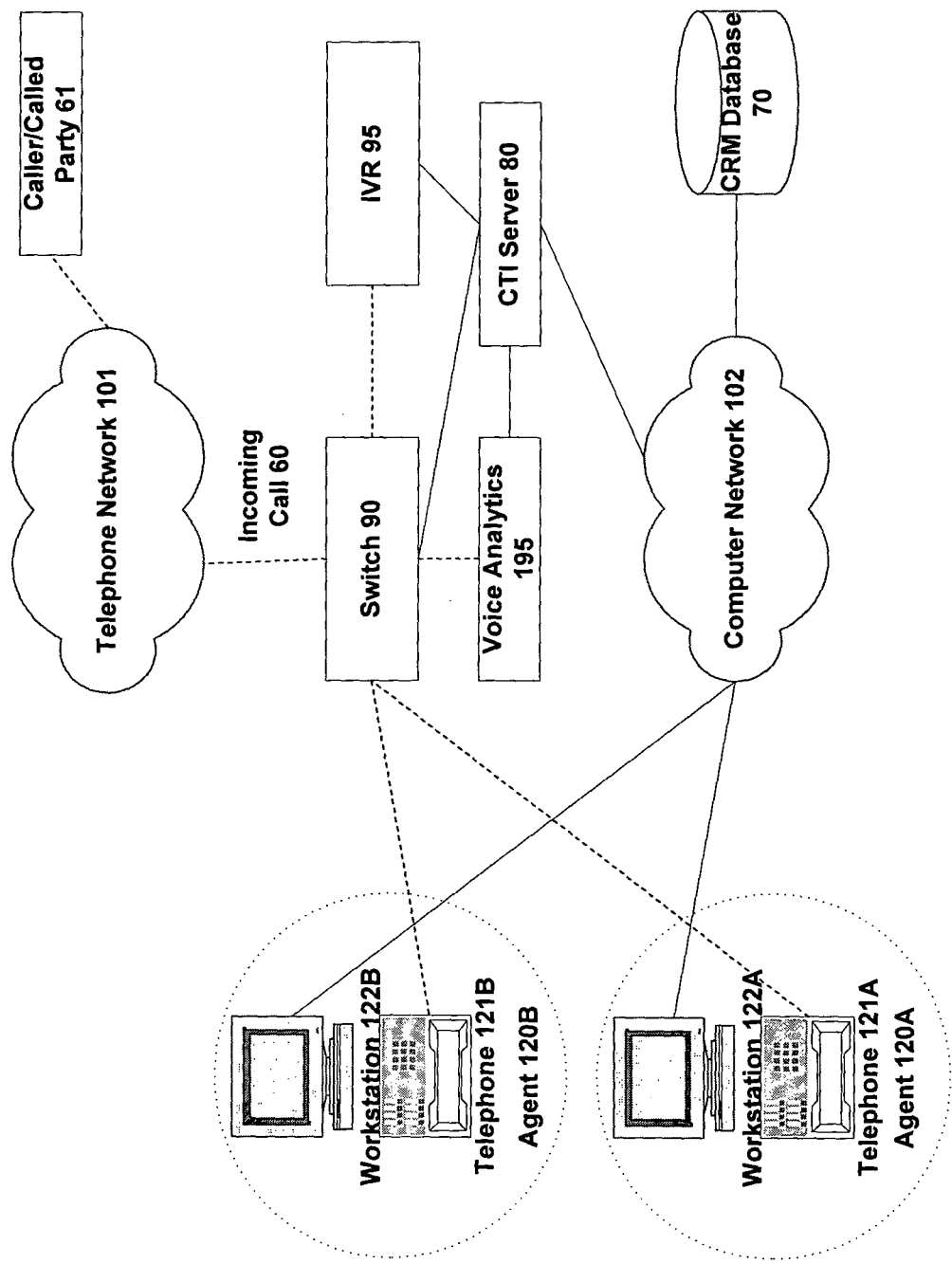
FIG. 1 is a schematic diagram of a CTI system in accordance with one embodiment of the invention.

FIG. 1 is an illustration of a computer-telephony integration (CTI) system using customer premises equipment (CPE). Note that FIG. 1 depicts computer links in solid lines, and telephony links in broken lines.

The system of FIG. 1 receives an incoming call 60 from telephone network 101 at switch 90 from caller 61 (although the system may also be used for outbound calls, such as in telemarketing, in which case caller 61 would be the called party). The switch passes information about the call to a CTI server 80. The information passed may include, for example, the calling line identification (CLID), sometimes known as automatic number identification (ANI), and/or the dialed number identification.

Switch 90 may also be provided with an interactive voice response (IVR) unit 95 which may be used to obtain additional information from the caller, for example an account number or such like. This additional information may also be passed to CTI server 80. The IVR unit 95 may be further used to play various messages to the caller 61 as part of the initial call handling, for example to allow a caller to specify the type of desired action—e.g. make a new booking, amend a previous booking, or some other query. Caller input in response to such messages can then be used subsequently in determining how to handle the call.

The switch 90 routes the incoming call 60 over an internal telephone network (not specifically shown in FIG. 1) to a telephone 121 belonging to an agent 120. For example, the switch may route a particular incoming call 60 to agent 120B having telephone 121B. The CTI server 80 may instruct the switch 90 which particular agent to forward the incoming call to. In other implementations, the switch 90 may make this decision through some other mechanism, such as agent availability (and notify the CTI server 80 accordingly).

In addition to telephone 121, each agent 120 is also provided with a workstation 122. The CTI server 80 has access to a customer relationship management (CRM) database 70. The CTI server 80 can use information about a particular call provided by switch 90 to look up information relating to the caller 61 in the CRM database 70. For example, this information may represent the name and address of a party associated with a particular calling line identification, as well as any information about previous orders this person may have made, etc.

The CTI server 80 now provides this information to the workstation 122 associated with the agent 120 who receives the call from switch 90. For example if the incoming call 60 is to be routed to telephone 121B of agent 120B, then the CTI server accesses information about the caller from CRM database 70 and forwards this information to corresponding workstation 122B. Another possibility is that the CTI server provides the corresponding workstation with a link that allows the workstation itself to retrieve relevant information from CRM database 70. This information received by workstation 122 can be used in order to assist the agent in handling the call.

The computer-telephony system of FIG. 1 also includes a voice analytics system 195. The voice analytics system monitors in real-time the audio signal for calls 60. Note that the voice analytics system is not an end-point of the call; rather the two end-points of the call are caller 61 and agent telephone 121 (or IVR 95, depending on the processing and stage of the call). Instead, the voice analytics system 195 in effect performs a silent tap or listening on the call 60 which is transparent to the two parties on the call (although the caller may potentially be notified of the presence of voice analytics system 195, for example by playing an appropriate message using IVR 95).

The CTI system of FIG. 1 may exploit the combination of search technology and computer-telephony as described in WO2008/015373. Furthermore, the CTI server 80 in conjunction with the CRM database 70 may adopt the architecture described in WO2008/040954.

In addition, although FIG. 1 depicts a CPE environment, a similar approach can also be used for a service provider equipment (SPE) environment. In this latter case, the CTI server 80 is logically located within the telephone network 101 itself, rather than on the customer side of the telephone network.

Figure 2:
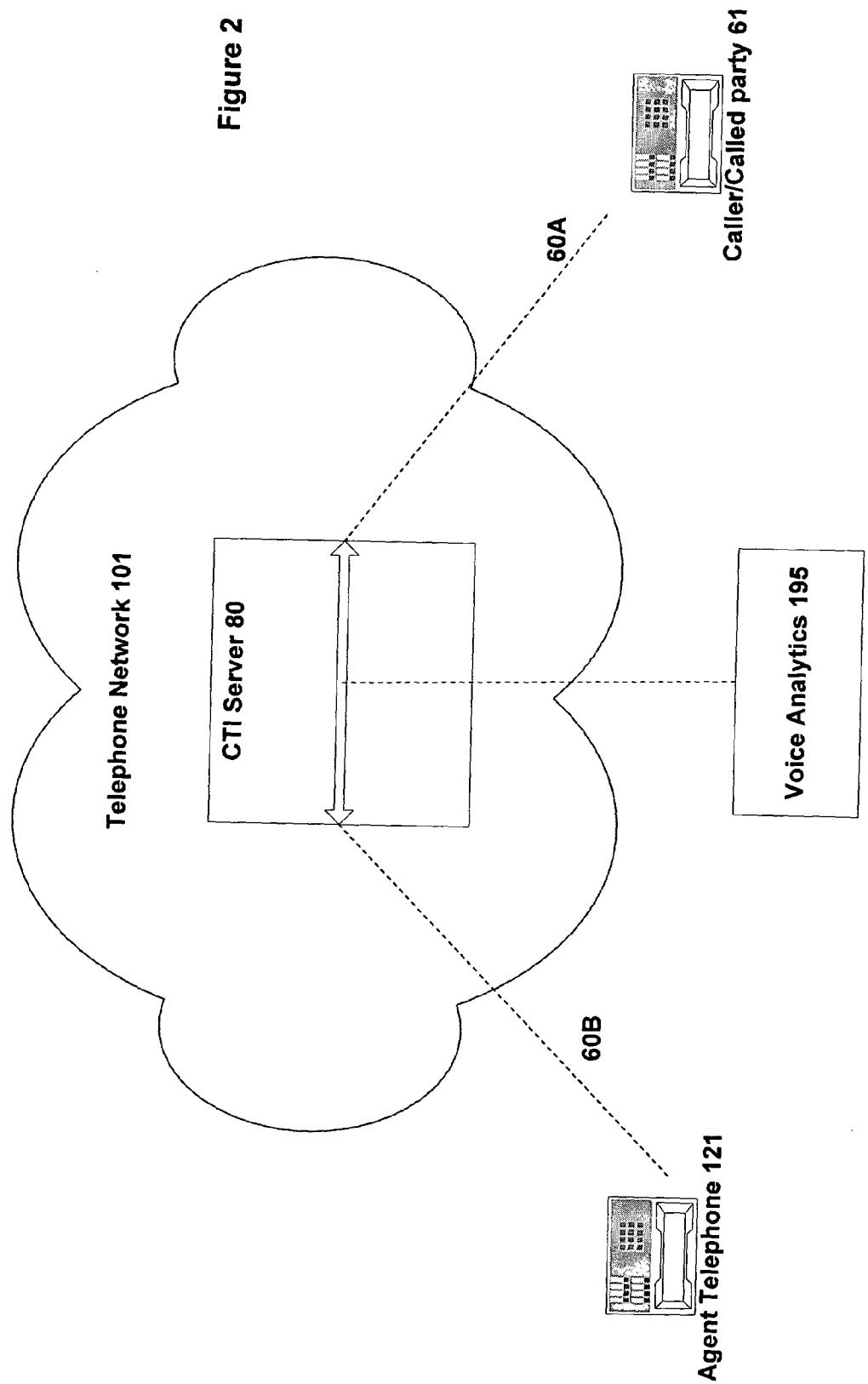
FIG. 2 is a schematic diagram of a call being bridged in an SPE environment using voice analytics in accordance with one embodiment of the invention.

FIG. 2 is a schematic illustration of an SPE implementation (omitting many of the details that are the same as for the embodiment of FIG. 1) in accordance with one embodiment of the invention. In the particular embodiment of FIG. 2, the CTI server 80 operates to provide a bridge between two calls; a first call 60A between the caller 61 and the CTI server 80, and the second call 60B between the CTI server and an agent telephone 121. This bridge configuration is generally transparent to the caller and the agent, who perceive just a single end-to-end call 60 (from caller to agent).

The bridge configuration provides a convenient location for CTI server 80 to apply the voice analytics system 195 to perform real-time monitoring of call 60. Note that although FIG. 2 depicts just a single voice analytics system 195, there may be multiple such systems present, for example to provide increased capacity to handle a large number of telephone calls simultaneously. In addition, a single call may also be monitored simultaneously by two or more different voice analytics systems, for example, one system to perform speech recognition, and another system to perform lie detection and/or some other voice analytics function (or a single voice analytics system might be multi-functional). The voice analytics system(s) 195 may be implemented by one or more processing boards (sometimes referred to as blades) included in CTI server 80 or some other appropriate apparatus located in telephone network 101.

FIG. 2A shows another implementation of a call being bridged in an SPE environment in accordance with one embodiment of the invention. In this implementation, the CTI server 80 is located (hosted) in a cloud 401. The cloud 401 is a high-capacity data processing centre generally provided by a third party supplier, for example Amazon (www.amazon.com). In the embodiment shown in FIG. 2A, the voice analytics system 195 and the CRM database 70 are also located within cloud 401, although in other embodiments, either or both of these features may be located (at least in part) outside the cloud 401.

In this embodiment, when party 61 makes a call on a particular number, corresponding to a given organisation, the telephone number 101 recognises that this call is to be handled by CTI server 80, and therefore directs the call accordingly. The CTI server 80 can then make a determination of where to route the call as previously described, for example using information from CRM database 70 accessed on the basis of the calling and/or called number. The CTI server then instructs the telephone network 101 to complete the second leg of the call, 60B, such as to agent telephone 121. This then allows the caller 61 to talk with the agent 121 while having the telephone conversation monitored or listened into by voice analytics system 195. The CTI server 80 may also provide information related to the call to a workstation 122 associated with the agent telephone 121 over the Internet or any other appropriate data communication link. This information may include details about the caller retrieved from CRM database 70, or any other appropriate data.

The SPE implementation shown in FIGS. 2 and 2A allows the CTI server 80 to service customers in a very flexible arrangement. For example, multiple customers can be supported by a single CTI server, allowing CTI services to be provided more efficiently and cost-effectively. Note that the customer (the operator of agent telephone 121) does not have to acquire or maintain any specific hardware, other than standard telephone links into the agent telephone 121 and standard data communication links into workstation 122.

The use of cloud 401 for the SPE implementation of FIG. 2A has further benefits associated with good scability. This is important in a call centre environment, which is often characterised by significant (but to some extent predictable) variations in call traffic. For example, an advertising campaign or special promotion may temporarily lead to a high volume of calls. The CTI server 80 in cloud 401 can be rapidly scaled up to cope with this increased call volume, without the supplier of CTI services (the operator of CTI server 80) having to provide or install new hardware. The extra capacity can then be released (returned to the cloud) in line with subsiding call volumes as the promotion or campaign comes to an end.

The use of the cloud 401 for the SPE implementation of FIG. 2A also allows the CTI server 80 to interact more easily with calls carried by multiple different telephone network operators. In particular, the CTI server is not so closely tied to the hardware of any one given network operator (fixed and/or mobile and/or Internet).

Figure 3:
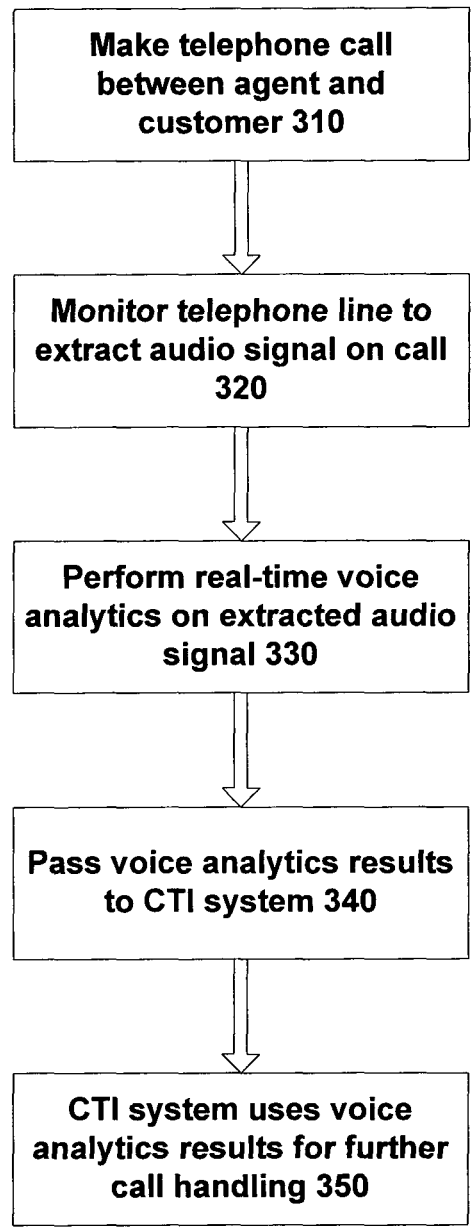
FIG. 3 is a flowchart of a method for handling a telephone call in accordance with one embodiment of the invention.

FIG. 3 is a flow-chart of a method for handling a telephone call, for example using the apparatus of FIG. 1 or FIG. 2, in accordance with one embodiment of the invention. The method commences with forming a telephone call between two parties 310, who will be referred to as the agent and the customer. Note that this is without limitation as to the roles and business activities of the two parties. In addition, in some cases the role of the agent might be taken by an IVR or some other automated system (e.g. a computerised information service) for at least part (and potentially all) of the call.

The telephone line is now monitored 320 in order to extract the audio signal for the telephone conversation occurring as part of the call. This monitoring will generally be transparent to the parties on the call. Voice analytics may now be performed on the extracted audio signal 330. The voice analytics may comprise one or more of the services discussed above, such as speech recognition, lie detection, and speaker identification or authentication, and/or any other available voice analytics function.

In some cases only the contributions of one of the parties may be monitored. For example, speaker authentication may be applied to the caller, to verify their identity, but not to the agent, who may have signed on using a password at a call centre. Such one-way monitoring can be facilitated by the bridging arrangement illustrated in the embodiment of FIG. 2.

The results from the voice analytics are passed to the CTI server 340. The CTI server 350 then uses the results for determining further handling of the call 350. Such further handling may include one or more of the following:

a) impacting the application flow or script used by the agent involved in the call (via interaction with workstation 122);
 b) alerting a supervisor to participate in the call;
 c) transferring the call from the agent currently involved with the call, e.g. to an agent with different skills and/or experience, to a supervisor, or to an IVR system.
 d) asking the caller to complete a particular survey or playing the caller a particular advertisement at the end of the call.

The CTI server may also store the voice analytics results into the CRM. These results can then be used to determine future handling of calls relating to that caller (based on the CLID associated with the caller, or an account number, etc). For example, if it is determined that the caller asked about a product that is not yet available (or out of stock), the system may determine to schedule a call to the customer when the product does become available in the future.

Figure 4:
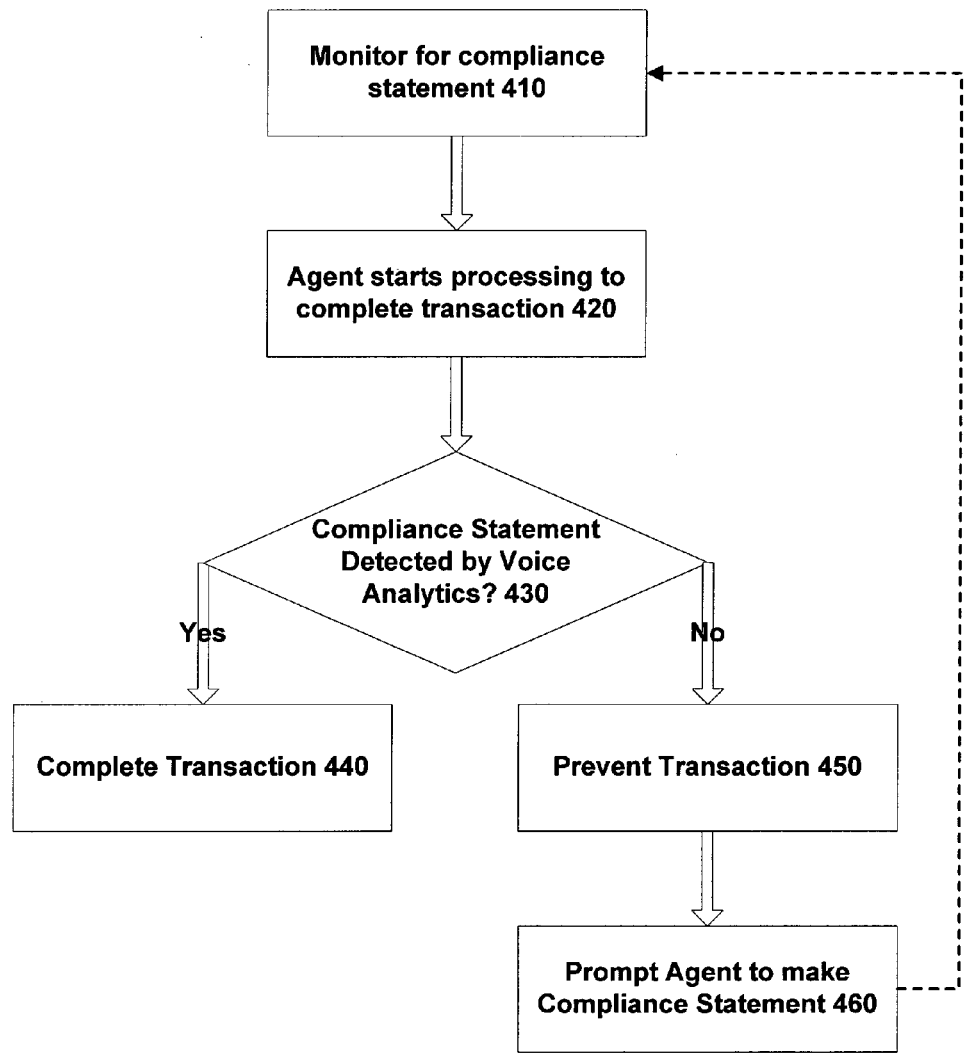
FIG. 4 is a flowchart of a method of using the voice analytics system to monitor for a compliance statement in accordance with one embodiment of the invention.

FIG. 4 illustrates an example of a particular application involving the voice analytics system in accordance with one embodiment of the invention. In this embodiment, an agent is required by law or other regulations to make certain statements (often referred to as compliance statement). For example, in a financial environment, an agent may be compelled to warn a caller that the value of a potential investment can go both up and down. The voice analytics system can be used to monitor the call 410 to confirm to the CTI server 80 that this compliance statement has indeed been made by performing speech recognition on the caller input. It will be appreciated that searching for a particular, predetermined phrase in conversation is a somewhat easier task than completely generalised speech recognition.

When the agent attempts to complete the transaction 420, for example to take a payment from the call, it is determined whether or not the compliance statement has been detected on the call 430. If so, then the CTI server running the agent application allows the transaction to complete 440. On the other hand, if the compliance statement has not been detected, then the CTI server running the agent application prevents the transaction from completing 450. It will be appreciated that this procedure ensures that the call centre provider will not fall foul of the relevant regulation even if there is some omission on the part of the call centre agent. Moreover, because the voice analytics is performed in real-time, it is possible to remedy any issues during the call itself, thereby allowing the transaction to be successful completed. This prevents the completion of defective transactions which would later have to be cancelled (a more complex and expensive operation).

It will be appreciated that good application design and an agent script should generally help ensure that compliance statements and/or other desired statements are made to the caller. However, the present approach provides specific and reliable confirmation that the statements were indeed spoken to the caller (in contrast to just assuming that the agent always follows the script provided). In addition, this confirmation is still obtained irrespective of the application flow, which may not always conform to the expected pattern (for example, if the caller is transferred between agents or departments).

As shown in FIG. 4, if the compliance statement has not been detected, the system will generally assist the agent in making this statement in order to allow the transaction to complete. For example, the CTI server may alter the agent script or application to instruct the agent to make the required statement in step 460. Once the voice analytics system has detected that the compliance statement has indeed been made, then the system allows the transaction statement to complete. Another option (not shown in FIG. 4) would be to switch the caller to a VRU to play the compliance statement to the caller, whereupon it would again be known that the transaction can now complete.

In the embodiment of FIG. 4, the voice analytics system monitors the content of the telephone call continuously for the compliance statement In an alternative embodiment, the call may just be recorded until the agent attempts to complete the transaction. This action from the agent then prompts the voice analytics system to scan the call recording (while the call is still in progress) for the compliance statement. The system then allows the transaction to complete if the compliance statement is located in the call recording. Note that this approach reduces the number of telephone calls for simultaneous monitoring by the voice analytics system, but generally requires faster processing once the voice analytics system is invoked on a particular call.

A similar approach to that shown in FIG. 4 can be adopted for statements or information that are not required by law, but only by company policy. For example, the voice analytics may be used to confirm that an agent always provides the user with an option of payment by installments. Likewise, the statements or information may be required by some supervisory or regulatory body. (These can also be regarded as a form of compliance statement).

Another example of the use of a real-time voice analytics system is for speaker identification, speaker authentication and/or lie detection to confirm a telephone transaction. For example, if a caller initially registers with a call centre, then subsequent calls from the caller can be matched to the original voice pattern for that speaker. This can then provide greater security than just requiring the caller to enter a PIN. (Of course, the voice analytics can be used in conjunction with PIN entry). If the voice analytics indicates some potential problem, the caller may be required to provide additional security information before the requested transaction (e.g. purchase, bank transfer, etc) can complete.

Figure 5:
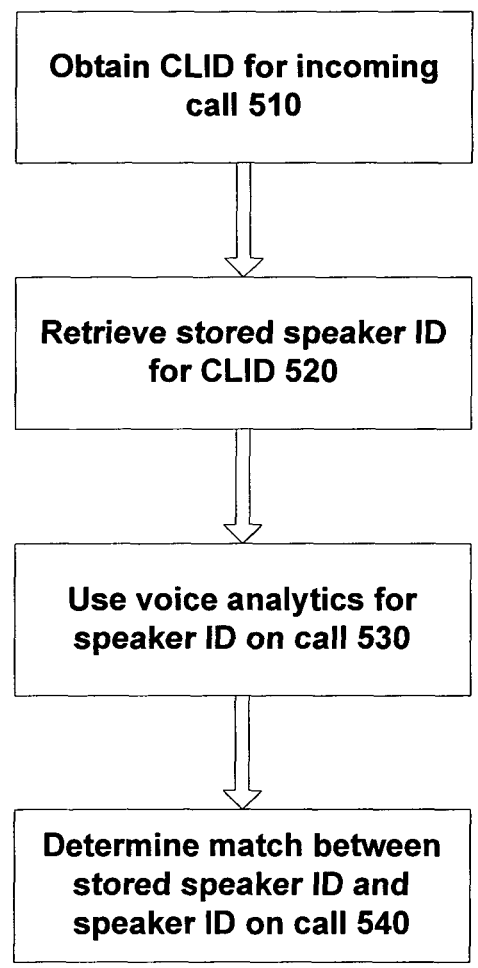
FIG. 5 is a flowchart of a method of using the voice analytics system to confirm the identity of a caller in accordance with one embodiment of the invention.

In one particular embodiment, as illustrated in the flowchart of FIG. 5, a combination of calling line ID (CLID) and voice pattern matching is used to provide a high level of confidence concerning the identity of the caller. Thus an initial registration procedure (not shown in FIG. 5) may associate a given voice pattern with a CLID. When an incoming call is made, the CLID is obtained 510 from the telephone network, and this is used to retrieve the stored voice pattern 520 (e.g. from CRM database 70 or any other appropriate source). The voice analytics system then monitors the call to obtain speaker identification information for the person making the call 530 and this can then be matched against the stored information that has been retrieved 540 to confirm the identity of the caller.

This combined verification of CLID and speaker identification provides a high level of security. Firstly, it is very difficult to fake a CLID, since this information is generated (and controlled) within the telephone network itself. Furthermore, the voice pattern then provides protection against illicit or improper use of a given CLID—for example where a mobile telephone has been stolen, or where different members of the same household share a (fixed line) telephone. Conversely, the CLID can be used to determine a particular voice pattern to match against, rather than having to match against all registered voice patterns, where the risk of an accidental, false positive match is much higher.

In addition, the combination of CLID and voice pattern does not require a user to memorise or utilise any other access information (e.g. a PIN). This makes the system much easier for a caller to use, and also provides better security, since there is no risk of the access information being compromised to a third party—e.g. by writing down the PIN to help remember it. Furthermore, both CLID and voice pattern are often stable for many years, which is especially helpful to organisations where customer contact may be relatively infrequent (and where it is particularly difficult to remember a PIN or suchlike from one contact to another).

A further example of the use of voice analytics in conjunction with the computer-telephony server 80 is where an agent prompts a caller for information which the agent then types into his or her workstation for saving into the CRM database 70 (or other appropriate location). The information to be stored in this manner might represent an address, order details, etc.

The information entered by the agent may assist the voice analytics (or vice versa). For example, the information added may include words (especially names of a person or place) that a speech recognition system encounters only rarely (if at all). However, once it knows that such words are relevant for this particular telephone call, this can generally enhance the speech recognition accuracy throughout the call.

Another possibility is that the speech recognition system helps to validate the data entry by the agent. Thus the speech recognition system can look for the information entered by the agent in the audio signal (this is a rather easier task again than generalised speech recognition). If the speech recognition system can't find the information in the audio signal, this might indicate that the agent has made a mistake. The CTI server might then prompt the agent to double-check the entered information with the caller while the call is still in progress.

A further possible use of a voice analytics system as described herein is to monitor for unhappy or distressed customers (or agents). These might be detected, for example, by the presence of swear words, and/or by changes to the voice pattern which may become more stressed, louder, etc. The system may respond to the detection of a distressed customer (or agent) by alerting a supervisor. For example, the supervisor may be automatically patched into the call. Another possibility is that the supervisor is provided with some on-screen indicator or flag of a potential problem on the call, e.g. in a listing of all pending calls, changing the colour of this particular call in comparison with all the other calls. The supervisor can then determine whether, and how best to intervene.

A system such as described herein may be implemented, for example, by suitable programming of a computer system, and/or by the use (at least in part) of special-purpose hardware. One embodiment of the invention provides a computer program product for implementing a method such as described above. The computer program product may comprise a set of instruction for execution by a system for download over a computer network 102. The computer program product may also comprise a set of instructions stored on a medium such as a hard disk, CD ROM, DVD, or flash memory.

The skilled person will be aware of a range of possible modifications of the various embodiments described above. Accordingly, the present invention is defined by the appended claims and their equivalents.

The invention claimed is:

1. A computer-implemented method of handling a telephone call, the method comprising:
monitoring a conversation between an agent and a customer on a telephone line as part of said telephone call to extract the audio signal therefrom;
performing real-time voice analytics on the extracted audio signal while the telephone call is in progress, and passing results from the voice analytics to a computer-telephony integration system responsible for the call, wherein the computer-telephony system is located in a telephony carrier service provider equipment (SPE) environment located remotely from a customer service center where a plurality of agents that serve customers for an enterprise are located, and wherein the computer-telephony system provides a bridge for the telephone call between the agent and the customer, wherein the audio signal is extracted at the bridge, and wherein the real-time voice analytics is performed by a speech analytics server computer located in the service provider environment proximate to the bridge; and
using the results by the computer-telephony integration system for determining future handling of the call in respect of compliance testing in order to confirm that the agent has made one or more predetermined statements relating to a transaction during the telephone conversation; and
if the voice analytics system does not confirm that the agent has made said the one or more predetermined statements, automatically preventing by the computer-telephony integration system the agent from completing the transaction with the caller.

2. The method of claim 1, wherein the computer-telephony system provides a bridge for the telephone call between the agent and the customer, and wherein said audio signal is extracted at said bridge.

3. The method of claim 1, wherein the computer-telephony system is implemented on a cloud computing service.

4. The method of claim 1, wherein the agent represents an interactive voice response unit.

5. The method of claim 1, wherein if the voice analytics system does not confirm that the agent has made said one or more predetermined statements, the application flow for the call is modified to help ensure that the one or more one predetermined statements are made while the telephone call is still in progress.

6. The method of claim 1, wherein the modification of the application flow includes transferring the caller to an interactive voice response system to make the one or more predetermined statements automatically.

7. The method of claim 1, further comprising allowing the transaction to complete after modification of the application flow and the one or more predetermined statements have been made.

8. The method of claim 1, further comprising:
receiving an incoming telephone call at a computer-telephony system and obtaining a calling line identification associated with the call, wherein the monitored conversation between an agent and a customer on a telephone line is part of said telephone call; and
using said results by the computer-telephony integration system for authenticating a party on the call by a combination of the voice analytics results and the calling line identification.

9. The method of claim 8, wherein the speaker authentication is performed against a stored template for the customer which is identified based on the calling line ID.

10. The method of claim 1, wherein the voice analytics are only performed on the audio signal from one of the agent or the customer.

11. The method of claim 1, further comprising the agent entering text data into the computer telephony integration system during the call.

12. The method of claim 11, wherein the entered text data is passed to the voice analytics system to assist with the analysis of the telephone conversation.

13. The method of claim 12, wherein the voice analytics system is used to confirm that the agent has entered the correct text into the computer-telephony integration server based on what is said during the telephone conversation.

14. The method of claim 1, wherein voice analytics system is in the network in said SPE environment.

15. A non-transitory computer-readable storage medium containing a computer program comprising instructions for a computer-telephony integration system to handle a telephone call according to the following method:
monitoring a conversation between an agent and a customer on a telephone line as part of said telephone call to extract the audio signal therefrom;
performing real-time voice analytics on the extracted audio signal while the telephone call is in progress, and passing results from the voice analytics to a computer-telephony integration system responsible for the call, wherein the computer-telephony system is located in a telephony carrier service provider equipment (SPE) environment located remotely from a customer service center where a plurality of agents that serve customers for an enterprise are located, and wherein the computer-telephony system provides a bridge for the telephone call between the agent and the customer, wherein the audio signal is extracted at the bridge, and wherein the real-time voice analytics is performed by a speech analytics server computer located in the service provider environment proximate to the bridge; and
using said results by the computer-telephony integration system for determining future handling of the call in respect of compliance testing and to confirm that the agent has made one or more predetermined statements relating to a transaction during the telephone conversation, wherein if the voice analytics system does not confirm that the agent has made said one or more predetermined statements, the computer-telephony integration system is configured to prevent the agent from completing the transaction with the caller.

16. A computer-telephony integration system for handling a telephone call in an SPE environment within a telephone network, the system comprising:
a line connection for monitoring a conversation between an agent and a customer on a telephone line as part of said telephone call to extract the audio signal therefrom;
a voice analytics system located in the SPE environment for performing real-time voice analytics on the extracted audio signal while the telephone call is in progress, and for passing results from the voice analytics to a computer- telephony integration server responsible for the call; and
a computer-telephony integration server located in the SPE environment for receiving the results from the voice analytics system and using said results for determining future handling of the call in respect of compliance testing and to confirm that the agent has made one or more predetermined statements relating to a transaction during the telephone conversation, wherein if the voice analytics system does not confirm that the agent has made said one or more predetermined statements, the computer-telephony integration system is configured to prevent the agent from completing the transaction with the caller.

17. The computer-telephony integration system of claim 16, wherein the line connection is configured to obtain a calling line identification associated with the call, and wherein the computer-telephony integration system is configured to authenticate the customer on the call by a combination of the results from the voice analytics system and the calling line identification.

* * * * *